(12) United States Patent
Lampe et al.

(10) Patent No.: US 9,813,677 B2
(45) Date of Patent: Nov. 7, 2017

(54) METHOD AND APPARATUS TO TRANSMIT VIDEO DATA

(71) Applicant: Verint Systems Inc., Santa Clara, CA (US)

(72) Inventors: Charles Lampe, Silver Springs, MD (US); Todd Barrick, Ellicott, MD (US)

(73) Assignee: Verint Americas Inc., Alpharetta, GA (US)

( * ) Notice: Subject to any disclaimer, the term of this patent is extended or adjusted under 35 U.S.C. 154(b) by 100 days.

(21) Appl. No.: 14/580,364

(22) Filed: Dec. 23, 2014

(65) Prior Publication Data

US 2015/0109448 A1  Apr. 23, 2015

Related U.S. Application Data

(63) Continuation of application No. 12/942,111, filed on Nov. 9, 2010, now abandoned.

(60) Provisional application No. 61/259,452, filed on Nov. 9, 2009, provisional application No. 61/259,464, filed on Nov. 9, 2009.

(51) Int. Cl.
*H04N 5/38* (2006.01)
*H04N 7/04* (2006.01)
*H04N 7/18* (2006.01)

(52) U.S. Cl.
CPC .............. *H04N 7/185* (2013.01); *H04N 5/38* (2013.01); *H04N 7/04* (2013.01); *H04N 7/181* (2013.01)

(58) Field of Classification Search
CPC combination set(s) only.
See application file for complete search history.

(56) References Cited

U.S. PATENT DOCUMENTS

| | | | |
|---|---|---|---|
| 5,351,075 A | 9/1994 | Herz et al. | |
| 5,724,521 A | 3/1998 | Dedrick | |
| 5,790,935 A | 8/1998 | Payton | |
| 5,852,435 A | 12/1998 | Vigneaux et al. | |
| 5,892,905 A | 4/1999 | Brandt et al. | |
| 5,973,683 A | 10/1999 | Cragun et al. | |
| 6,298,290 B1 * | 10/2001 | Abe ..................... | G07C 5/0891 340/937 |
| 6,338,044 B1 | 1/2002 | Cook et al. | |
| 6,389,339 B1 * | 5/2002 | Just ....................... | B60R 25/302 701/24 |
| 6,785,717 B1 | 8/2004 | Nickerson et al. | |
| 7,024,681 B1 | 4/2006 | Fransman et al. | |
| 7,055,166 B1 * | 5/2006 | Logan ................... | H04H 20/14 715/719 |
| 7,356,389 B2 * | 4/2008 | Holst ....................... | G06F 8/61 244/1 R |
| 7,865,306 B2 | 1/2011 | Mays | |

(Continued)

*Primary Examiner* — Mohammed Rahaman
*Assistant Examiner* — Asmamaw G Tarko
(74) *Attorney, Agent, or Firm* — Meunier Carlin & Curfman LLC (57) ABSTRACT

A video system includes at least one video subsystem including a video source coupled to a mobile platform. The video source is configured to capture and transmit video data. A video processing system is configured to receive transmission of the video data from the video subsystem at a plurality of locations in which the video subsystem is configured to transmit the video data to the video processing system automatically when the video subsystem is in range of the video processing system at each of the plurality of locations.

16 Claims, 5 Drawing Sheets

(56) References Cited

U.S. PATENT DOCUMENTS

| | | | |
|---|---|---|---|
| 7,872,593 B1* | 1/2011 | Rauscher | G06T 5/50 340/539.25 |
| 8,131,429 B2* | 3/2012 | Plaster | B60R 25/102 701/45 |
| 8,321,126 B2 | 11/2012 | Mays | |
| 2004/0128324 A1* | 7/2004 | Sheynman | G06F 21/10 |
| 2004/0199303 A1* | 10/2004 | Ohmura | G07B 15/00 701/5 |
| 2005/0039208 A1* | 2/2005 | Veeck | H04N 7/18 725/76 |
| 2006/0026529 A1* | 2/2006 | Paulsen | G11B 27/034 715/776 |
| 2007/0094328 A1 | 4/2007 | Birch | |
| 2007/0287477 A1* | 12/2007 | Tran | H04L 29/06027 455/466 |
| 2008/0183843 A1* | 7/2008 | Gavin | G06Q 30/06 709/217 |
| 2010/0138745 A1 | 6/2010 | McNamara et al. | |
| 2010/0194884 A1* | 8/2010 | Plaster | B60R 25/102 348/148 |
| 2010/0194885 A1* | 8/2010 | Plaster | B60R 25/10 348/148 |
| 2010/0293580 A1* | 11/2010 | Latchman | G07C 5/0866 725/71 |
| 2013/0208112 A1 | 8/2013 | Tanaka et al. | |

* cited by examiner

METHOD AND APPARATUS TO TRANSMIT VIDEO DATA

RELATED APPLICATIONS

This application is a continuation of U.S. Utility application Ser. No. 12/942,111 filed Nov. 9, 2010, entitled "METHOD AND APPARATUS TO TRANSMIT VIDEO DATA," which claims the benefit of U.S. Provisional Patent Application Ser. No. 61/259,452 filed Nov. 9, 2009, entitled "METHOD AND APPARATUS TO TRANSMIT VIDEO DATA," and U.S. Provisional Patent Application Ser. No. 61/259,464 filed Nov. 9, 2009, entitled "METHOD AND APPARATUS TO PREVIEW VIDEO DATA FROM A VEHICLE," all of which are hereby incorporated by reference in their entireties.

TECHNICAL BACKGROUND

Presently, transit vehicles store video data over the course of a shift and download the video data to a storage system when they return to a depot at the end of the shift. However, the bandwidth available at the depot may be limited, especially if several vehicles are downloading the video data at the same time. As a result, only a subset of the video data is often downloaded. This subset often includes video data that has been specifically identified by an operator for downloading during the shift. However, if an operator fails to identify a scene that may be interest, that scene may be lost when subsequent video data is recorded over the previously recorded video data.

OVERVIEW

A video system includes at least one video subsystem including a video source coupled to a mobile platform. The video source is configured to capture and transmit video data. A video processing system is configured to receive transmission of the video data from the video subsystem at a plurality of locations in which the video subsystem is configured to transmit the video data to the video processing system automatically when the video subsystem is in range of the video processing system at each of the plurality of locations.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Presently, transit vehicles store video all day and download once they park in the depot. But, the wireless bandwidth available at the depot is very limited, and thus only a subset of the video data is downloaded. The remaining portion is written over. Disclose herein is a method and apparatus for the transit vehicles to automatically download video data throughout the day whenever a wireless hotspot is encountered. Inexpensive hotspots could be constructed and placed throughout a route.

Figure 1:
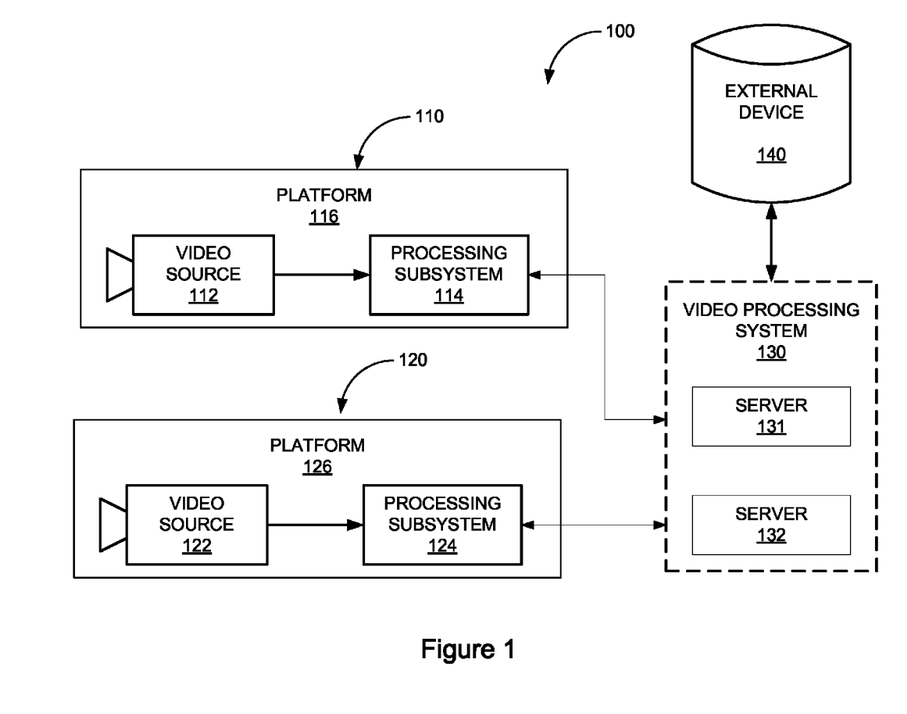
FIG. 1 illustrates a block diagram of an example of a video system.

FIG. 1 illustrates a schematic view of an exemplary video system 100. The exemplary video system 100 generally includes at least one video subsystem, such as video subsystems 110, 120. The video system 100 also includes at least one video processing system, such as video processing system 130 and at least one external device 140.

The video subsystems 110, 120 are configured to capture video data over the course of a time interval. In at least one example, input from an operator, system intelligence, or other input during the shift may identify video data to be transferred from the video subsystems to the external device 140 via the video processing system 130 during the shift 130. Once the shift has ended, the video subsystems 110, 120 may then download additional video data stored thereon to the external device 140 directly. The external device 140 may include a storage system, an input/output interface, and/or other external devices as desired.

The video processing system 130 is configured to communicate with the video subsystems 110, 120 during the shift to transmit portions of the video data to the external device 140, as will be described at appropriate points hereinafter. Such a configuration can allow for a more complete transfer of video data that occurs during a shift.

Further, the video processing system 130 may allow an administrator to preview the video data during a shift. Previewing the video data during a shift may allow the administrators to identify video data that should be acted on as soon as possible, thereby allowing earlier access to potentially relevant video data. The general configuration of the exemplary video subsystems 110, 120 and the video processing system 130 will first be discussed, followed by a more detailed description of various components with the video subsystems 110, 120 and the video processing system 130.

As illustrated in FIG. 1, the video subsystem 110 generally includes a video source 112 and a processing subsystem 114 associated with a platform 116. In the illustrated example, the video source 112 is in communication with the processing subsystem 114, which in turn is in communication with the video processing system 130.

Similarly, the second video subsystem 120 may include a video source 122 and a processing subsystem 124 associated with a platform 126. The video source 122 is in communication with video processing subsystem 126, which in turn is in communication with the video processing system 130.

In at least one example, the processing subsystems 114, 124 may be very basic processing systems configured to transmit raw video data to the video processing system 130. In other examples, the processing subsystems 114, 124 may be more full-featured and may do some amount of video processing before transmitting the processed video data to the video processing system 130.

The connections and links between the elements of video system 100 may use various communication media, such as air, metal, optical fiber, or some other signal propagation path—including combinations thereof. Such connections may be direct links, or they might include various intermediate components, systems, and networks.

The video processing system 130 includes at least one device configured to receive transmissions of video subsystems 110, 120. In the illustrated example, the video processing system 130 includes at least one server configured to communication with either or both of the video subsystems 110, 120, such as servers 131, 132. Accordingly, FIG. 1 illustrates the video subsystems 110, 120 in communication with the entire video processing system 130 to emphasize the video subsystems 110, 120 may couple to either or both of the servers 131, 132, which are part of the video processing system 130. The video processing system 130 then processes the video data to a desired extent.

Once the video processing system 130 has processed the video data, the video processing system 130 transmits some or all of the video data to an external device 140 or other external device. By providing a plurality of pathways which the video subsystems 110, 120 may use to transfer video data from their locations to the central storage systems 140 during their shifts, the video processing system 130 may increase the amount of video data from each shift the video system 100 is able to retain.

Further, such a configuration may allow the video processing system 130 to provide a preview of video data. Such a situation may be desirable when relevance of selected video data is unclear and thus it is unclear whether it would be desirable to analyze the selected video data immediately or whether it may be suitable to analyze the selected video data at a later time. To this point, the locations of the video subsystems 110, 120 and the servers 131, 132 have been introduced generally.

Figure 2:
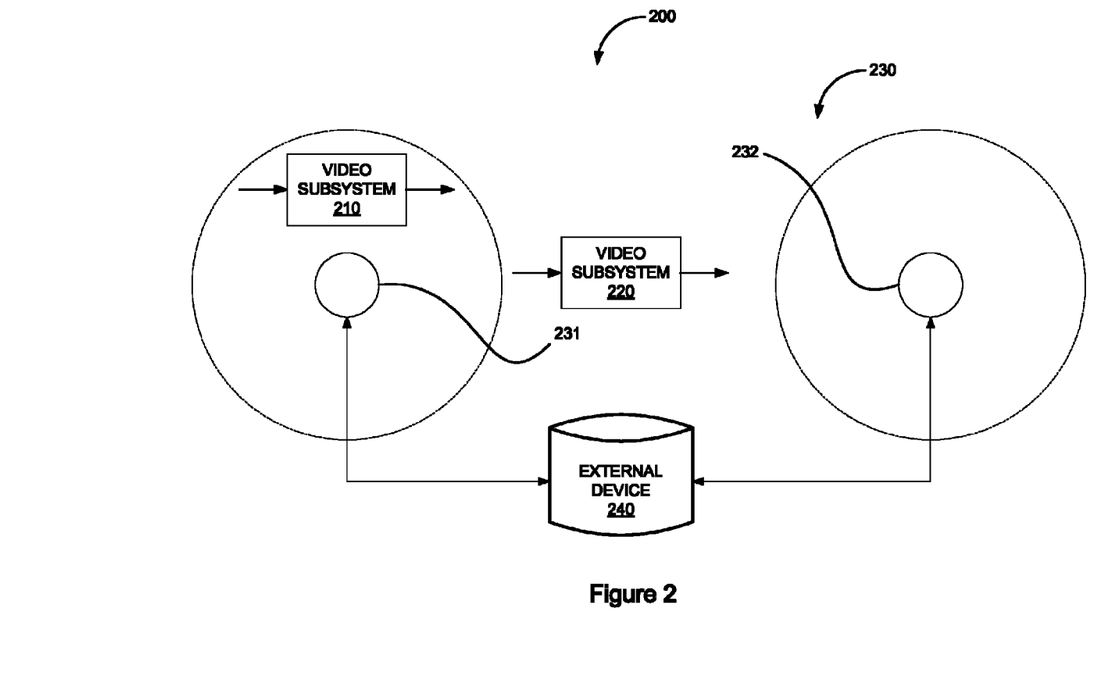
FIG. 2 illustrates a block diagram of an example of a video system.

One exemplary arrangement is illustrated in more detail in FIG. 2. As illustrated in FIG. 2, a video system 200 may include a plurality of video subsystems 210, 220 positioned within a geographical region. The video subsystems 210, 220 may be configured similarly to the video subsystems as have been described with reference to FIG. 1 or as will be described with reference to FIG. 4. In any case, the video subsystems 210, 220 are configured to communicate with a processing/transmission system 230 at various locations within the region.

In the illustrated example, the processing/transmission system 230 includes a plurality of hotspots 231, 232. The hotspots 231, 232 may be at fixed locations or mobile locations. For ease of reference, the hotspots 231, 232 will be described as being located at fixed geographic locations.

The hotspots 231, 232 may be configured to provide a range of coverage, illustrated by the dashed lines around the hotspots 231, 232. In such an example, the video subsystems 210, 220 may automatically couple with the video processing system 230 when the video subsystems 210, 220 are within range of the hotspots 231, 232. One such example may occur when the platforms associated with the video subsystems 210, 220 are vehicles that move along various routes within the region. Such routes may include transit routes, such that the vehicles may be transit vehicles.

In the illustrated example, the video subsystem 210 is shown in range of the hotspot 231. While the video subsystem 210 is thus in range of the hotspot 231, the video subsystem 231 automatically transmits video data to the hotspot 231, which in turn transmits the video data to an external system 240.

The selection of which video data the video subsystem 210 transmits may be determined in response to user input, by system intelligence, or by some combination thereof. The transmission of video data to the hotspot 231 may part of a download operation and/or may be a preview of video data that has been identified for potential investigation. Each of these two scenarios will now be discussed in more detail.

Figure 3:
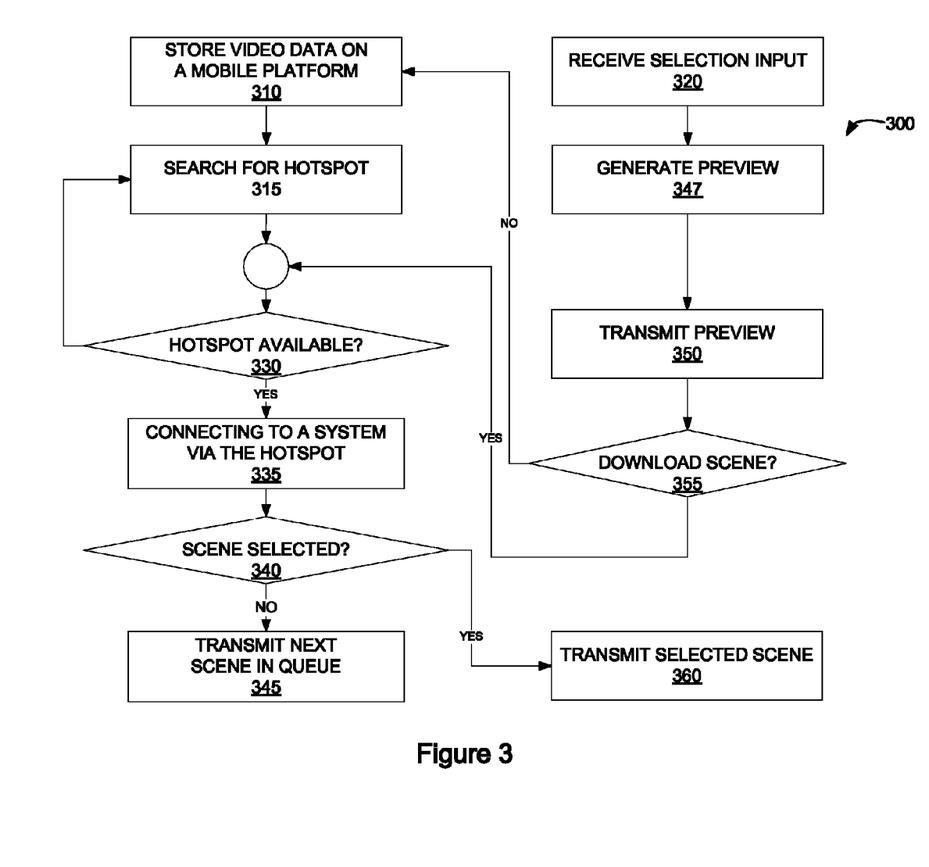
FIG. 3 illustrates a method of transmitting video data.

FIG. 3 illustrates a method 300 for transmitting video data from a video subsystem to according to one example. As illustrated in FIG. 3, the method 300 begins at step 310 when a video system begins by storing video data on a video subsystem that includes a mobile platform. The video data may include any number of scenes.

As previously discussed, the mobile platform may include one or more video subsystem that travels along various routes within a geographical region. The video subsystems may be configured to communicate with one or more hotspots within the geographical region. Accordingly, the method includes searching for hotspots at step 315 as the video subsystems travel along the various routes. Searching for hotspots 315 may include searching for wireless hotspots.

In at least one example, the method 300 may also optionally include at step 320 receiving selection input to identify one or more scene for investigation by an administrator. This step is shown in parallel with the steps of storing video data 310 and searching for hotspots 315 since all three of these steps may be performed on an ongoing basis.

As shown in FIG. 3, if a hot spot is not available (NO, step 330), the video subsystem continues to search for a hotspot until an available hotspot is in range. Once a hotspot is available (YES, step 330), the method includes connecting to a system via the hotspot. Connecting to a system via the hotspot may include connecting to a processing/transmission system that is in further communication with an external device, such as a storage system or an I/O interface.

How the video subsystem transmits video data may depend on whether a scene has been selected at step 340. If no scene is selected (NO, step 340), then the video subsystem transmits the next scene in a transmission queue at step 345 to an external storage device, such as a storage system. Such an example may occur where no previews are available in the optional steps described above or if no input selection has been received to select a scene. A transmission queue may be merely the earliest video data yet to be transmitted or may be any other arrangement of video data, such as video data that have been selected for retention, but which have been identified as being suitable for analysis at the end of the shift.

However, if a scene has been selected, various steps may be performed to indicate how the video data should be treated. Referring still to FIG. 3, once selection input is received at step 320, the method includes generating a preview of the scene identified by the selection input at step 347. Previews may be generated in any desired format, such as a video clip, video stills, or any other desired format.

If a scene has been selected the method includes transmitting the preview at step 350. For example, the preview may be transmitted to an external I/O device. In at least one example, transmitting the preview may include transmitting the scene to an I/O device for an administrator to view. In at least one example, the preview may be transmitted once the preview is generated. Further, the preview may be generated using any suitable network including the processing systems described herein, wide area networks, cellular networks, other networks, or combinations thereof.

As a result, the method includes determining whether to download the identified scene at step 355. As previously introduced, the preview may be generated and sent to an administrator at steps 325 and 350. For example, an administrator may provide instructions to the video subsystem to download the scene or not at step 355. These instructions may be provided from the same network used to transmit the preview or may be provided in some other manner. If the instructions indicate the scene is to be downloaded, the video subsystem prioritizes delivery of that scene. As a result, when the video subsystem has coupled to a system via a hotspot as described in steps 310-340, at step 340 the system then determines that a scene has been selected (Yes, step 340) and the video subsystem transmits the selected scene to an external device at step 345, such as a storage system accessible by an administrator.

If, however, the instructions indicate that the scene should not be downloaded immediately (NO, step 355), the video subsystem continues to store the video data and handles the video data normally, as indicated by the arrow from the NO decision returning to the first step of the process. In such a process, the video data may be transmitted when in turn as part of the transmission processes described herein.

Though two video subsystems are shown, it will be appreciated that the video system 200 may include any number of video subsystems. Further, while two hotspots 231, 232 are shown, it will be appreciated that any number of hotspots may be distributed within a region.

As introduced, any number of video subsystems may communicate with the external device 240 via the hotspots 231, 232. Accordingly, a large number of video subsystems may all communicate with the video processing system 230. Communication between several video subsystems and the video processing system 230 may result in bandwidth concerns as video processing system 230 may not have an input port capable of receiving full resolution, real time video from all of the video sources.

In such a case, it may be desirable to incorporate some video processing functionality within each of the video sources and video transmission systems associated with each of the carriers such that the bandwidth requirements between the various video sources and video processing system 130 are reduced. An example of such a video source is illustrated in FIG. 4.

Figure 4:
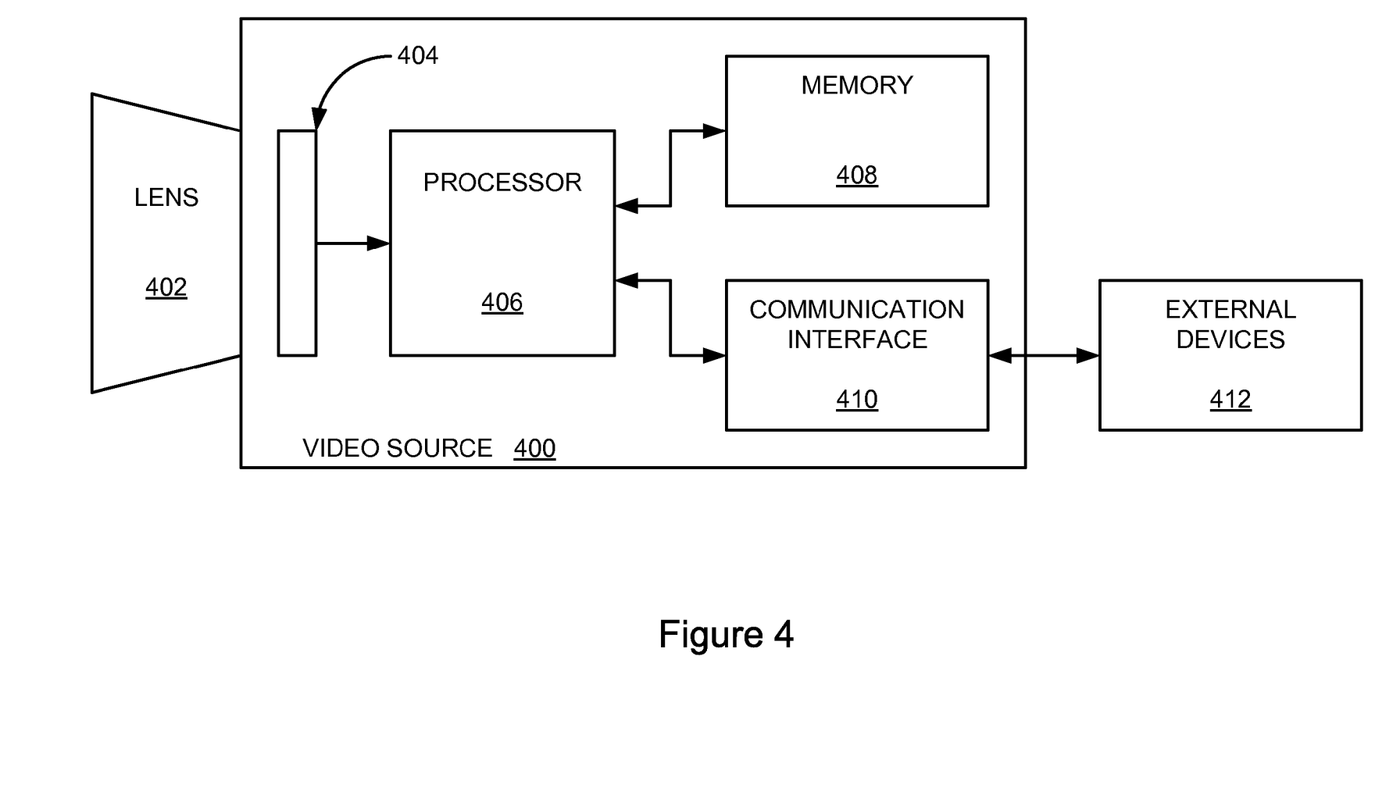
FIG. 4 illustrates a block diagram of an example of a video source.

FIG. 4 is a block diagram of an exemplary video source 300 similar to video sources 112, 122 (FIG. 1). The video source 400 includes a lens 402, a sensor 404, a processor 406, memory 408, and a communication interface 410. The lens 402 is configured to focus an image of a scene on the sensor 404. The lens 402 may be any type of lens, pinhole, zone plate, or the like able to direct light to and/or focus an image on the sensor 404. The sensor 404 then digitally captures video of the scene and passes the video images to the processor 406. The processor 406 is configured to store some or all of the video in the memory 408, process the video, and send the processed video to external devices 412 through the communication interface 410. In some examples, the external devices 412 may include the video processing system 130 and/or the external device 140 (both seen in FIG. 1).

Figure 5:
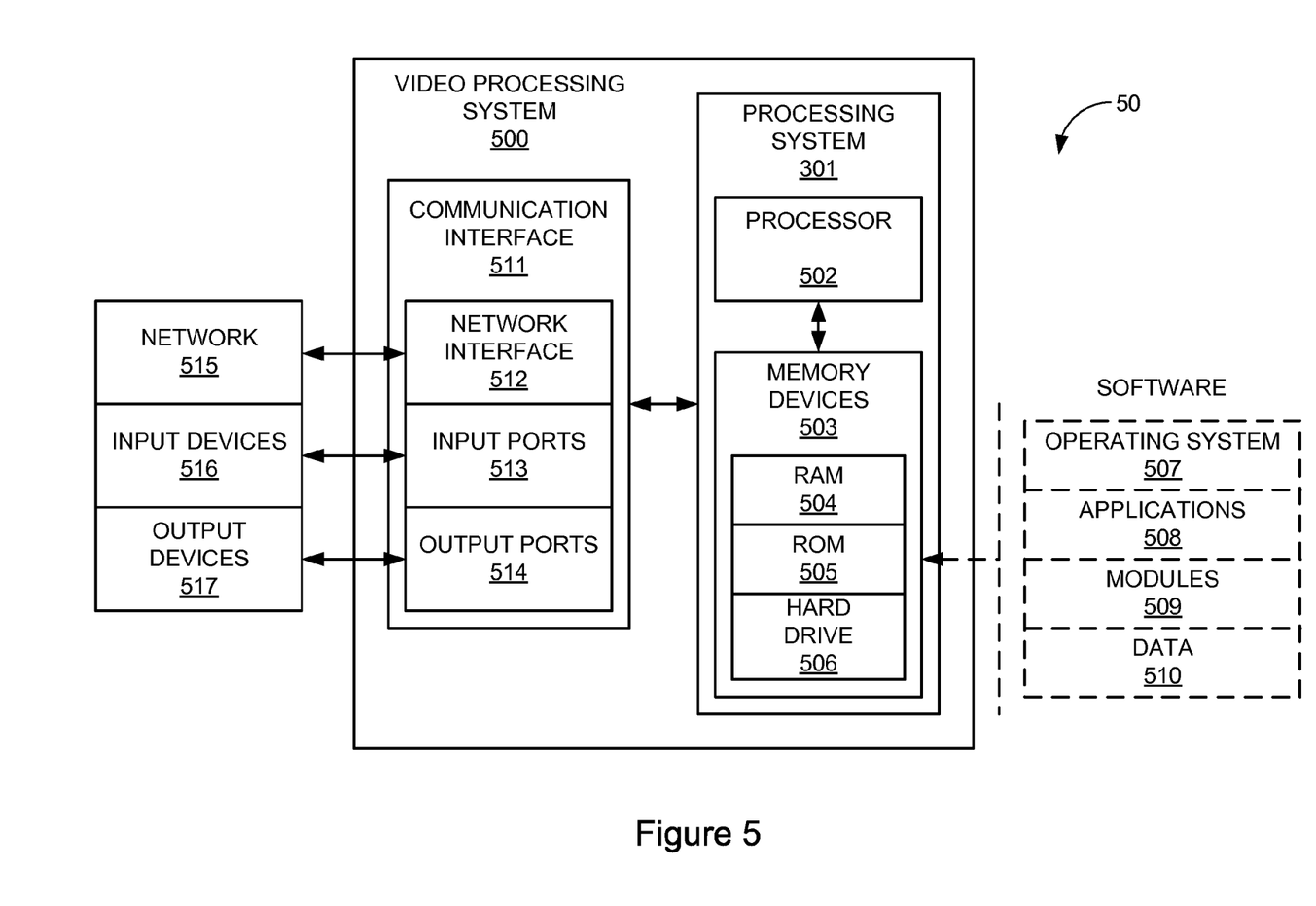
FIG. 5 illustrates a block diagram of an example of a video system.

Any of the processing subsystems 110, 120 (FIG. 1), the video processing system 130 (FIG. 1), the processor 406 from FIG. 2 and the video processing system 510 from FIG. 5 may be implemented on a computer system 50 such as that shown in FIG. 5. The computer system 50 includes a video processing system 300. The video processing system 300 includes communication interface 311, and processing system 301. Processing system 301 is linked to communication interface 311 through a bus. Processing system 301 includes processor 302 and memory devices 303 that store operating software.

Communication interface 511 includes network interface 512, input ports 513, and output ports 514. Communication interface 511 includes components that communicate over communication links, such as network cards, ports, RF transceivers, processing circuitry and software, or some other communication device. Communication interface 511 may be configured to communicate over metallic, wireless, or optical links. Communication interface 511 may be configured to use TDM, IP, Ethernet, optical networking, wireless protocols, communication signaling, or some other communication format—including combinations thereof.

Network interface 512 is configured to connect to external devices over network 515. In some examples these external devices may include video sources and video storage systems as illustrated in FIGS. 1 and 5. Input ports 513 are configured to connect to input devices 516 such as a keyboard, mouse, or other user input devices. Output ports 514 are configured to connect to output devices 517 such as a display, a printer, or other output devices.

Processor 502 includes microprocessor and other circuitry that retrieves and executes operating software from memory devices 503. Memory devices 503 include random access memory (RAM) 504, read only memory (ROM) 505, a hard drive 506, and any other memory apparatus. Operating software includes computer programs, firmware, or some other form of machine-readable processing instructions. In this example, operating software includes operating system 507, applications 508, modules 509, and data 510. Operating software may include other software or data as required by any specific embodiment. When executed by processor 502, operating software directs processing system 501 to operate video processing system 500 to process and/or transfer video data as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transmitting video data, comprising:
capturing video data using a video source, wherein the video source is coupled to a vehicle that travels along a route within a region; and
transmitting the video data from the video source via a plurality of wireless hotspots, wherein the transmitting of the video data occurs only when and while the vehicle travels within a respective predetermined range of each of the plurality of wireless hotspots,
wherein the plurality of wireless hotspots are positioned along the route travelled by the vehicle,
receiving selection input to identify one or more scenes from the video data;
generating a video preview of the selected scenes; and
transmitting the video preview from the video source via the plurality of wireless hotspots, wherein the video preview is transmitted prior to the video data, and wherein the transmitting of the video preview occurs only when and while the vehicle travels within a respective predetermined range of each of the plurality of wireless hotspots.

2. The method of claim 1, further comprising transmitting the video data and the video preview from the wireless hotspots to a processing system or a storage system, wherein the processing system and storage system are located remotely from the wireless hotspots.

3. The method of claim 1, further comprising transmitting the video data and the video preview from the video source to the storage system by way of the processing system when and while the vehicle travels within a respective predetermined range of the processing system, wherein the video preview is transmitted prior to the video data, and wherein the transmitting of the video data and the video preview via direct connection.

4. The method of claim 3, wherein the storage system is located remotely from the video processing system and the wireless hotspots.

5. The method of claim 4, wherein the video preview is transmitted to the storage system prior to the transmission of the video data to the storage system.

6. The method of claim 1, further comprising directly transmitting the video data and the video preview to the storage system when and while the vehicle travels within a respective predetermined range of the storage system.

7. The method of claim 6, wherein the storage system is located remotely from the video processing system and the wireless hotspots.

8. The method of claim 7, wherein the video preview is transmitted to the storage system prior to the transmission of the video data to the storage system.

9. A video system, comprising:
a plurality of wireless hotspots; and
a video source coupled to a vehicle that travels along a route within a region, wherein the video source is configured to capture video data and to transmit the video data via the plurality of wireless hotspots, wherein the transmitting of the video data occurs only when and while the vehicle travels within a respective predetermined range of each of the plurality of wireless hotspots,
wherein the plurality of wireless hotspots are positioned along the route travelled by the vehicle,
receive selection input to identify one or more scenes from the video data;
generate a video preview of the selected scenes; and
transmit the video preview from the vehicle via the plurality of wireless hotspots, wherein the video preview is transmitted prior to the transmission of the video data, and wherein the transmitting of the video preview occurs only when and while the vehicle travels within a respective predetermined range of each of the plurality of wireless hotspots.

10. The video system of claim 9, further comprising a video processing system and a storage system, wherein the wireless hotspots are configured to transmit the video data and the video preview to the processing system or the storage system, wherein the processing system and storage system are located remotely from the wireless hotspots.

11. The video system of claim 9, further comprising a video processing system and a storage system, wherein the video source is further configured to transmit the video data and the video preview to the storage system by way of the processing system when and while the vehicle travels within a respective predetermined range of the processing system.

12. The video system of claim 11, wherein the storage system is located remotely from the video processing system and the wireless hotspots.

13. The video system of claim 12, wherein the video preview is transmitted to the storage system prior to the transmission of the video data to the storage system.

14. The video system of claim 9, further comprising a video processing system and a storage system, wherein the video source is further configured to directly transmit the video data and the video preview to the storage system when and while the vehicle travels within a respective predetermined range of the storage system.

15. The video system of claim 14, wherein the storage system is located remotely from the video processing system and the wireless hotspots.

16. The video system of claim 15, wherein the video preview is transmitted to the storage system prior to the transmission of the video data to the storage system.

* * * * *

UNITED STATES PATENT AND TRADEMARK OFFICE
CERTIFICATE OF CORRECTION

PATENT NO. : 9,813,677 B2
APPLICATION NO. : 14/580364
DATED : November 7, 2017
INVENTOR(S) : Charles Lampe et al.

Page 1 of 1

It is certified that error appears in the above-identified patent and that said Letters Patent is hereby corrected as shown below:

On the Title Page

At item (71), which is on the left column, replace the language following the Applicant with the following:
Verint Americas Inc.

Signed and Sealed this
Second Day of October, 2018

Andrei Iancu
*Director of the United States Patent and Trademark Office*